(12) United States Patent
Demuynck et al.

(10) Patent No.: US 8,301,188 B2
(45) Date of Patent: *Oct. 30, 2012

(54) ELECTRONIC DEVICES INCLUDING SUBSTRATE MOUNTED ACOUSTIC ACTUATORS AND RELATED METHODS AND MOBILE RADIOTELEPHONES

(75) Inventors: Randolph Cary Demuynck, Wake Forest, NC (US); William Chris Eaton, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 478 days.

This patent is subject to a terminal disclaimer.

(21) Appl. No.: 12/265,965

(22) Filed: Nov. 6, 2008

(65) Prior Publication Data

US 2010/0113087 A1    May 6, 2010

(51) Int. Cl.
H04M 1/00 (2006.01)
H04M 9/00 (2006.01)
H04R 25/00 (2006.01)
H04R 1/02 (2006.01)
H04R 1/00 (2006.01)
H04R 1/20 (2006.01)

(52) U.S. Cl. ............ 455/550.1; 381/152; 381/431; 381/351; 381/345; 381/386; 371/419; 371/420.01; 371/420.02; 371/388; 371/432

(58) Field of Classification Search ............ 379/420.02, 379/433.02; 381/152, 386, 387; 455/575.1
See application file for complete search history.

(56) References Cited

U.S. PATENT DOCUMENTS

| | | | |
|---|---|---|---|
| 6,411,719 B1 * | 6/2002 | Moster et al. | 381/345 |
| 7,050,578 B1 | 5/2006 | Watanabe | |
| 7,536,207 B2 * | 5/2009 | Son | 455/569.1 |
| 2002/0064292 A1 * | 5/2002 | Rombach et al. | 381/324 |
| 2003/0205238 A1 | 11/2003 | Bran | |
| 2004/0036656 A1 | 2/2004 | Neverman | |
| 2004/0202338 A1 * | 10/2004 | Longbotttom et al. | 381/190 |
| 2004/0204024 A1 * | 10/2004 | Voth et al. | 455/550.1 |

(Continued)

FOREIGN PATENT DOCUMENTS

EP    1 942 699    7/2008

(Continued)

OTHER PUBLICATIONS

JL Audio, Engineered Lead-Wire System, Aug. 14, 2007, http://web.archive.org/web/20110103223443/http://mobile.jlaudio.com/products_subs_pages.php?page_id=63.*
International Search Report and Written Opinion (15 pages) corresponding to International Application No. PCT/US2009/003124; Mailing Date: Aug. 25, 2009.
International Search Report and Written Opinion (14 pages) corresponding to International Application No. PCT/US2009/003050; Mailing Date: Aug. 17, 2009.

(Continued)

*Primary Examiner* — Kent Chang
*Assistant Examiner* — Nathan Brittingham
(74) *Attorney, Agent, or Firm* — Myers Bigel Sibley & Sajovec

(57) ABSTRACT

An electronic device may include a substrate and an acoustic actuator mounted on a surface of the substrate. More particularly, the acoustic actuator may be configured to generate displacements along a direction parallel with respect to the surface of the substrate in response to an electrical signal applied thereto. A speaker box may define an acoustic volume, and the speaker box may include a speaker box wall with a speaker box opening therethrough adjacent the acoustic actuator. A speaker membrane may be provided across the speaker box opening adjacent the acoustic actuator, and the speaker membrane may be mechanically coupled to the acoustic actuator so that the speaker membrane is configured to deflect responsive to displacements generated by the acoustic actuator. Related methods are also discussed.

17 Claims, 4 Drawing Sheets

U.S. PATENT DOCUMENTS

| | | | |
|---|---|---|---|
| 2004/0240698 A1 | 12/2004 | Eaton | |
| 2005/0129264 A1* | 6/2005 | Mitsuishi | 381/396 |
| 2006/0038733 A1* | 2/2006 | Wedel et al. | 343/795 |
| 2007/0010302 A1* | 1/2007 | Timms | 455/575.7 |
| 2007/0049326 A1* | 3/2007 | Kim | 455/550.1 |
| 2007/0116321 A1 | 5/2007 | Jang et al. | |
| 2007/0280497 A1 | 12/2007 | Isberg et al. | |
| 2010/0150389 A1* | 6/2010 | Sumiyama et al. | 381/386 |

FOREIGN PATENT DOCUMENTS

| | | |
|---|---|---|
| JP | 2006 019980 | 1/2006 |

OTHER PUBLICATIONS

Notification of Transmittal of the International Preliminary Report on Patentability; International Preliminary Report on Patentability corresponding to International Application No. PCT/US2009/003124; Date of mailing: Feb. 17, 2011; 17 pages.

Notification of Transmittal of the International Preliminary Report on Patentability; International Preliminary Report on Patentability corresponding to International Application No. PCT/US2009/003050; Date of issuance, May 10, 2011; 8 pages.

* cited by examiner

ELECTRONIC DEVICES INCLUDING SUBSTRATE MOUNTED ACOUSTIC ACTUATORS AND RELATED METHODS AND MOBILE RADIOTELEPHONES

FIELD OF THE INVENTION

The present invention relates to the field of electronics, and more particularly, to electronic devices including speakers and related methods.

BACKGROUND

Many portable electronic devices (such as cellular radiotelephones, global positioning systems, etc.) use one or more loudspeakers to provide audio information, and sizes of these electronic devices continue to shrink. A loudspeaker(s) in a cellular radiotelephone (separate from an ear speaker), for example, may be used to provide an incoming call alert (such as a ring tone) and/or to provide speakerphone operations. As sizes of electronic devices shrink, space available for a loudspeaker(s) may also shrink, but smaller loudspeakers may provide reduced performance. In particular, it may be difficult to provide suitable loudspeaker performance if an acoustic back volume and/or an area of a speaker membrane is reduced too much.

SUMMARY

According to some embodiments of the present invention an electronic device may include a substrate and an acoustic actuator mounted on a surface of the substrate. The acoustic actuator may be configured to generate displacements along a direction parallel with respect to the surface of the substrate in response to an electrical signal applied thereto. A speaker box may define an acoustic volume, and the speaker box may include a speaker box wall with a speaker box opening therethrough adjacent the acoustic actuator. A speaker membrane may be provided across the speaker box opening adjacent the acoustic actuator, and the speaker membrane may be mechanically coupled to the acoustic actuator so that the speaker membrane is configured to deflect responsive to displacements generated by the acoustic actuator.

The substrate may be a printed circuit board having at least one integrated circuit electronic device mechanically mounted thereon and electrically coupled thereto. The speaker box wall may be a first speaker box wall and a second speaker box wall may be spaced apart from the first speaker box wall so that the acoustic volume is defined between the first and second speaker box walls. In addition, a wireless transmitter and/or receiver may be configured to transmit and/or receive wireless communications from a remote electronic device, and a controller may be electrically coupled to the wireless transmitter and/or receiver with the controller being configured to process the communications transmitted to and/or received from the remote electronic device. An antenna may be electrically coupled to the wireless transmitter and/or receiver, and the antenna may extend along the second speaker box wall so that the acoustic volume is between portions of the antenna and the acoustic actuator.

The wireless transmitter and/or receiver may be a wireless transceiver configured to transmit and receive radiotelephone communications. A housing may define first and second ends and may enclose the substrate, the acoustic actuator, the speaker box, the speaker membrane, the wireless transceiver, and the antenna. Moreover, the speaker box and the antenna may be adjacent the first end of the housing. A microphone may also be adjacent the first end of the housing and may be electrically coupled to the controller. Moreover, the microphone may be configured to convert sound into an electrical signal to be processed by the controller and transmitted by the transceiver, and the microphone may be acoustically coupled to a first opening through the housing. A speaker adjacent the second end of the housing may be electrically coupled to the controller, and the speaker may be configured to convert an electrical signal from the controller into sound, and the speaker may be acoustically coupled to a second opening through the housing.

The acoustic volume may be a first acoustic volume (e.g., an acoustic back volume), and an acoustic enclosure may define a second acoustic volume (e.g., an acoustic front volume) so that the speaker membrane is between the first and second acoustic volumes. The acoustic enclosure may define an actuator opening therethrough, and the acoustic actuator may extend through the actuator opening. The acoustic enclosure may define a port configured to transmit sound generated by the acoustic actuator and speaker membrane, and a housing may enclose the substrate, the acoustic actuator, the speaker box, and the speaker membrane, with the port being acoustically coupled to a loudspeaker opening through the housing.

The acoustic actuator may include a coil and a permanent magnet. The permanent magnet may be fixed relative to the substrate, and the coil may be configured to move in the direction parallel with respect to the surface of the substrate responsive to the electrical signal. In addition, a pair of electrical traces on the speaker membrane may be electrically coupled to the coil, and the coil may be configured to move responsive to the electrical signal that is applied to the coil through the pair of electrically conductive traces.

According to other embodiments of the present invention, a method of assembling an electronic device may include providing a substrate having an acoustic actuator mounted on a surface of the substrate with the acoustic actuator being configured to generate displacements along a direction parallel with respect to the surface of the substrate in response to an electrical signal applied thereto. After providing the substrate having the acoustic actuator mounted thereon, the substrate may be positioned adjacent to a speaker membrane. After positioning the substrate adjacent to the speaker membrane, the acoustic actuator may be bonded to the speaker membrane so that the speaker membrane is configured to deflect responsive to displacements generated by the acoustic actuator.

Before positioning the substrate adjacent to the speaker membrane, the speaker membrane may be provided across an opening through a speaker box wall. The substrate may be a printed circuit board having at least one integrated circuit electronic device mechanically mounted thereon and electrically coupled thereto.

A speaker box defining an acoustic volume may be provided with the speaker box including a speaker box wall having an opening therethrough. Before positioning the substrate adjacent to the speaker membrane, the speaker membrane may be provided across the opening through the speaker box wall. The speaker box wall may be a first speaker box wall, and a second speaker box wall of the speaker box may be spaced apart from the first speaker box wall so that the acoustic volume is defined between first and second speaker box walls. An antenna may be provided that extends along the second speaker box wall so that the acoustic volume is between portions of the antenna and the acoustic actuator.

A wireless transceiver configured to transmit and receive radiotelephone communications may be provided, and the transceiver may be electrically coupled to the printed circuit board and to the antenna. A microphone electrically coupled to the transceiver may be provided with the microphone being configured to convert sound into an electrical signal to be transmitted by the transceiver. An ear speaker electrically coupled to the transceiver may be provided with the ear speaker being configured to convert an electrical signal from the transceiver into sound. In addition, the substrate, the acoustic actuator, the speaker box, the speaker membrane, the antenna, the wireless transceiver, the microphone, and the ear speaker may be enclosed in a housing. Moreover, the microphone may be acoustically coupled to a first opening through the housing adjacent a first end of the housing, the ear speaker may be acoustically coupled to a second opening through the housing adjacent a second end of the housing, and the antenna may be adjacent the first end of the housing.

The acoustic volume may be a first acoustic volume (e.g., an acoustic back volume), and an acoustic enclosure may be provided defining a second acoustic volume (e.g., an acoustic front volume) so that the speaker membrane is between the first and second acoustic volumes. The acoustic enclosure may define an actuator opening therethrough, the acoustic actuator may extend through the actuator opening, and the acoustic enclosure may define a port configured to transmit sound generated by the acoustic actuator and speaker membrane. The substrate, the acoustic actuator, the speaker box, and the speaker membrane may be enclosed in a housing with the port being acoustically coupled to an opening through the housing.

The acoustic actuator may include a coil and a permanent magnet. Moreover, the permanent magnet may be fixed relative to the substrate, and the coil may be configured to move in the direction parallel with respect to the surface of the substrate responsive to the electrical signal.

According to still other embodiments of the present invention, a mobile radiotelephone may include a printed circuit board and an acoustic actuator mounted on a surface of the printed circuit board. The acoustic actuator may be configured to generate displacements along a direction parallel with respect to the surface of the substrate in response to an electrical signal applied thereto. A speaker box may include first and second spaced apart speaker box walls defining an acoustic volume therebetween, and the first speaker box wall may have a speaker box opening therethrough adjacent the acoustic actuator. A speaker membrane may be provided across the speaker box opening adjacent the acoustic actuator, and the speaker membrane may be mechanically coupled to the acoustic actuator so that the speaker membrane is configured to deflect responsive to displacements generated by the acoustic actuator. A wireless transceiver may be electrically coupled to the printed circuit board, and the wireless transceiver may be configured to transmit and receive wireless communications to and from a remote electronic device. A controller may be electrically coupled to the wireless transceiver, and the controller may be configured to process the communications transmitted to and/or received from the remote electronic device. An antenna may be electrically coupled to the wireless transceiver, and the antenna may extend along the second speaker box wall so that the acoustic volume is between portions of the antenna and the acoustic actuator.

A housing may define first and second ends and may enclose the substrate, the acoustic actuator, the speaker box, the speaker membrane, the wireless transceiver, and the antenna, and the speaker box and the antenna may be adjacent the first end of the housing. A microphone may be provided adjacent the first end of the housing and may be electrically coupled to the controller. The microphone may be configured to convert sound into an electrical signal to be processed by the controller and transmitted by the transceiver, and the microphone may be acoustically coupled to a first opening through the housing. An ear speaker may be provided adjacent the second end of the housing and may be electrically coupled to the controller. Moreover, the speaker may be configured to convert an electrical signal from the controller into sound, and the speaker may be acoustically coupled to a second opening through the housing.

The acoustic volume may be a first acoustic volume (e.g., an acoustic back volume), and an acoustic enclosure may define a second acoustic volume (e.g., an acoustic front volume) so that the speaker membrane is between the first and second acoustic volumes. The acoustic enclosure may define an actuator opening therethrough, and the acoustic actuator may extend through the actuator opening. In addition, the acoustic enclosure may define a port configured to transmit sound generated by the acoustic actuator and speaker membrane, and the port may be acoustically coupled to a third opening through the housing.

DETAILED DESCRIPTION

Figure 1:
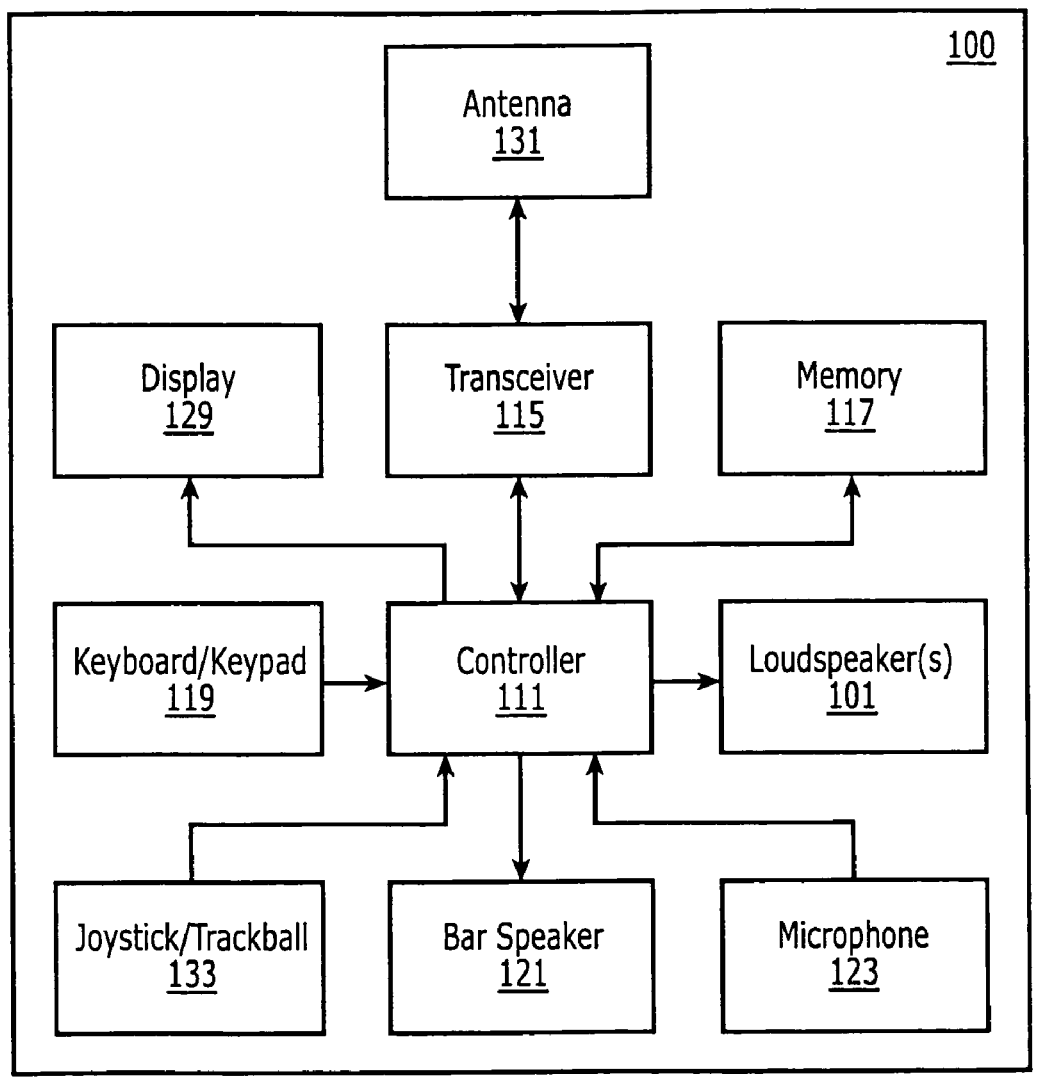
FIG. 1 is a block diagram of an electronic device including loudspeaker(s) according to some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. Moreover, dimensions (e.g., lengths, widths, heights, thicknesses, etc.) of elements shown in the figures may not be drawn to scale, and may instead be exaggerated for clarity.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described below with reference to block diagrams. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of wireless communication terminals for purposes of illustration and explanation only, the present invention is not limited thereto. It is to be understood that the present invention can be more broadly used in any sort of electronic device including an acoustic speaker therein.

It will be understood that, although the terms first, second, third etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the teachings of the present invention.

FIG. 1 is a block diagram of an electronic device 100 including loudspeaker(s) 101 according to some embodiments of the present invention. Electronic device 100, for example, may be a wireless communications device (such as a cellular radiotelephone), a Personal Digital Assistant (PDA), an audio/picture/video player/recorder, a global positioning (GPS) unit, a gaming device, or any other electronic device including loudspeaker(s) 101. Electronic device 100 may also include controller 111 coupled to loudspeaker(s) 101, coupled to radio transceiver 115 (including a transmitter and a receiver), coupled to memory 117, and coupled to display 129 (such as an LCD screen). In addition, keyboard/keypad 119, joystick/trackball 133, ear speaker 121, and/or microphone 123 may be coupled to controller 111. Moreover, transceiver 115 may be coupled to antenna 131. As discussed herein, electronic device 100 may be a cellular radiotelephone configured to provide PDA functionality, data network connectivity (such as Internet browsing), and/or other data functionality.

The controller 111 may be configured to communicate through transceiver 115 and antenna 131 over a wireless air interface with one or more RF transceiver base stations and/or other wireless communication devices using one or more wireless communication protocols such as, for example, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, Universal Mobile Telecommunications System (UMTS), WiMAX, and/or HIPERMAN, wireless local area network (e.g., 802.11), and/or Bluetooth. Controller 111 may be configured to carry out wireless communications functionality, such as conventional cellular phone functionality including, but not limited to, voice/video telephone calls and/or data messaging such as text/picture/video messaging.

The controller 111 may be further configured to provide various user applications which can include a music/picture/video recorder/player application, an e-mail/messaging application, a calendar/appointment application, and/or other user applications. The audio/picture/video recorder/player application can be configured to record and playback audio, digital pictures, and/or video that are captured by a sensor (e.g., microphone 123 and/or a camera) within electronic device 100, downloaded into electronic device 100 via radio transceiver 115 and controller 111, downloaded into electronic device 100 via a wired connection (e.g., via USB), and/or installed within electronic device 100 such as through a removable memory media. An e-mail/messaging application may be configured to allow a user to generate e-mail/messages (e.g., short messaging services messages and/or instant messages) for transmission via controller 111 and transceiver 115. A calendar/appointment application may provide a calendar and task schedule that can be viewed and edited by a user to schedule appointments and other tasks. Moreover, functionalities of display 129, keyboard/keypad 119, joystick/trackball 133, and/or other user interface elements may be combined, for example, using a touch sensitive display screen.

Elements of controller 111, transceiver 115, and/or memory 117 may be implemented, for example, using one or more integrated circuit semiconductor devices mounted on and electrically coupled to one or more printed circuit boards included within a housing. Moreover, controller 111 and/or elements thereof may be electrically coupled to display 129, keyboard/keypad 119, joystick/trackball 133, ear speaker 121, microphone 123, loudspeaker 101, memory 117, and/or transceiver 115 through electrically conductive paths (e.g., conductive traces and/or vias) provided in/on such a printed circuit board(s). While controller 111, transceiver 115, and memory 117 are illustrated as separate blocks by way of example, functionalities thereof may be combined and/or further subdivided. For example, a single transceiver block may be defined to perform functionalities of transceiver 115, controller 111, and memory 117, or a single controller block may be defined to perform functionalities of transceiver 115, controller 111, and memory 117.

Figure 2A:
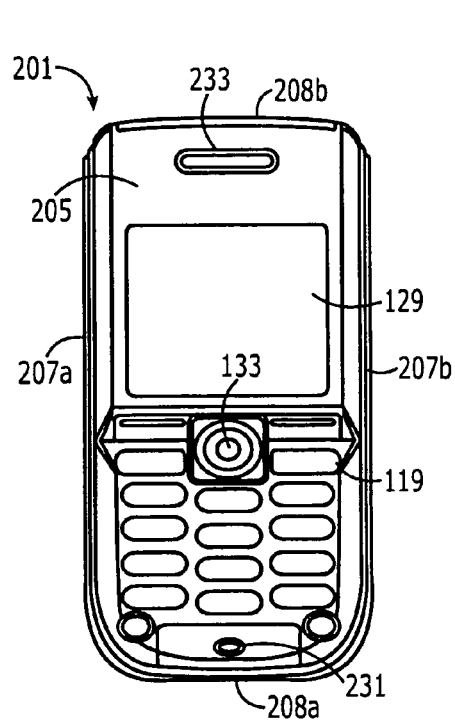
FIGS. 2A, 2B, and 2C are front side, back side, and edge views of an electronic device according to some embodiments of the present invention.
Figure 2B:
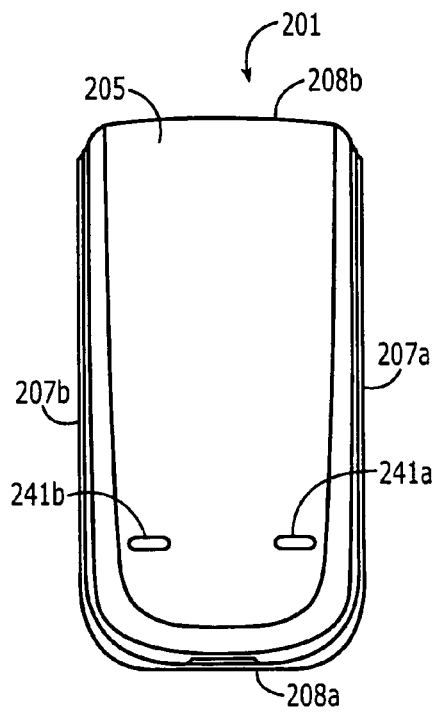
Figure 2C:
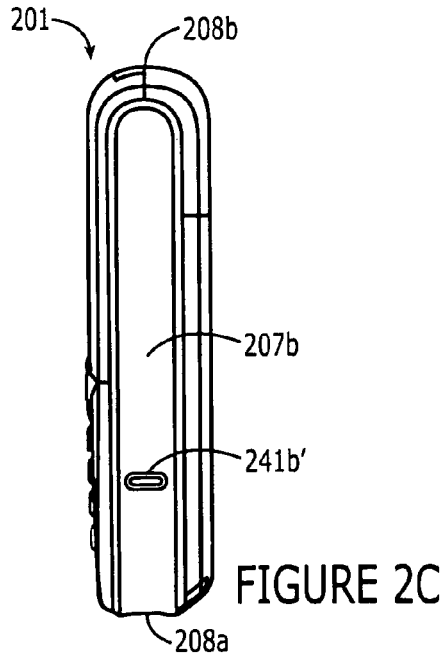

Internal elements of electronic device 100 may be enclosed in housing 201 illustrated in FIGS. 2A, 2B, and 2C, while other elements may be provided outside and/or may be visible through housing 201. As shown in FIGS. 2A, 2B, and 2C, housing 201 of electronic device 100 may include front side 203, back side 205, edges 207a-b, and ends 208a-b. While edge 207a is not shown in a separate figure, edge 207a may be a mirror image of edge 207b shown in FIG. 2C. Transceiver 115, controller 111, ear speaker 121, microphone 123, loudspeaker(s) 101, memory 117, and antenna 131 may be enclosed inside housing 201. Display 129 may be provided on and/or visible through front side 203 of housing 201, and keyboard/keypad 119 and joystick/trackball 133 may be accessible on front side 203 of housing 201.

As further shown in FIG. 2A, microphone opening 231 through front side 203 of housing 201 may be acoustically coupled to microphone 123 enclosed in housing 201 adjacent end 208a. Similarly, ear speaker opening 233 through front side 203 of housing 201 may be acoustically coupled to ear speaker 121 enclosed in housing 201 adjacent end 208a. Accordingly a user of electronic device 100 may hold ear speaker opening 233 to the user's ear during a radiotelephone conversation while electronic device 100 is oriented to extend from the user's ear in a direction canted slightly away from the user's head with the microphone opening 213 generally oriented toward the user's mouth. Accordingly, end 208a of housing 201 adjacent microphone 231 may be oriented most distant from the user's head during a radiotelephone conversation, and antenna 131 may thus be provided adjacent end 208a of housing 201 adjacent microphone opening 231 to reduce radio frequency (RF) shielding from the user's head during the radiotelephone conversation.

As shown in FIG. 2B, loudspeaker openings 241a and 241b may be provided though back side 205 of housing 201, and loudspeaker openings 241a and 241b may be acoustically coupled to loudspeakers 101 enclosed within housing 201. While two loudspeaker openings 241a and 241b coupled to respective loudspeakers are discussed (e.g., to provide stereo) by way of example, a single loudspeaker (and a single opening) may be provided, or three or more loudspeakers (and respective openings) may be provided. Loudspeakers 101, for example, may be used to provide an alert for an incoming call (e.g., to broadcast a ring tone), to provide a loudspeaker for speaker phone operations, to play audio content (e.g., to play music), etc. In other words, ear speaker 121 may be provided for use adjacent a user's ear, while loudspeakers 101 may be provided for use remote from a user's ear.

Spaced apart loudspeaker openings 241a-b are shown on back side 205 of housing 201 by way of example, but other arrangements may be provided. In addition and/or in an alternative, loudspeaker openings may be provided on an edge or edges of housing 201. As shown in FIG. 2C, for example, loudspeaker opening 241b' may be provided on edge 207b, and a corresponding loudspeaker opening may be provided on edge 207a (not shown). By providing spacing between loudspeaker openings (either on opposite sides of back side 205 or on opposite edges 207a and 207b), a stereo effect may be increased. By providing the loudspeakers 101 and antenna 131 adjacent a same end of housing 201, an empty space used to provide acoustic back volumes for loudspeakers 101 may also be used to increase an antenna volume separating antenna 131 from other conductive elements of the electronic device.

Figure 3A:
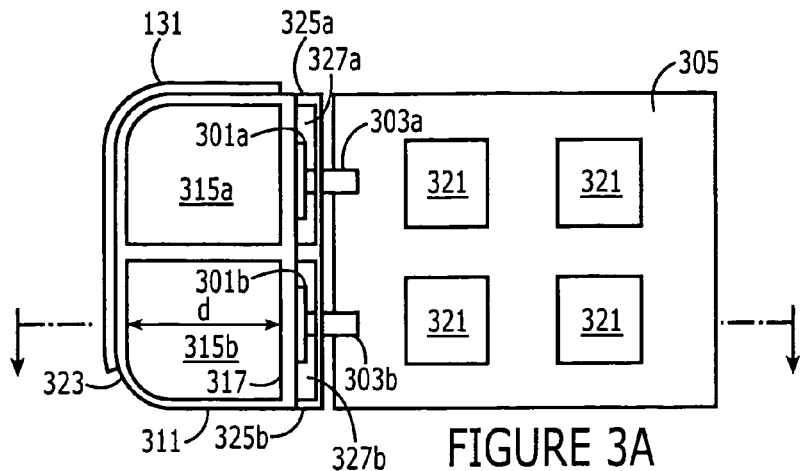
FIGS. 3A and 3B are respective plan and cross sectional views of structures used to provide loudspeakers according to some embodiments of the present invention.
Figure 3B:
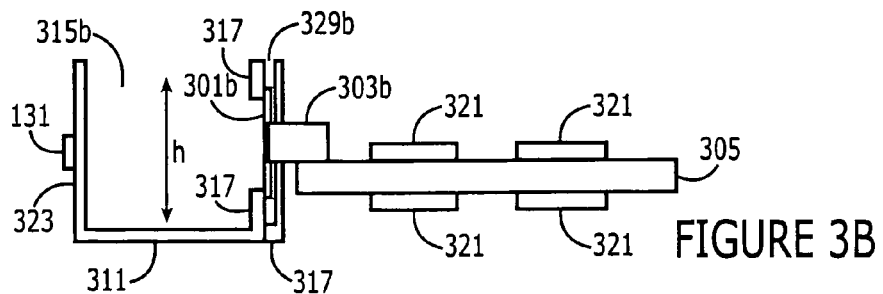

Interior structures used to provide loudspeakers 101 inside housing 201 are illustrated in FIGS. 3A and 3B. Each of loudspeakers 101 may include a speaker membrane 301a-b driven by a respective acoustic actuator 303a-b. Moreover, each acoustic actuator 303a-b may be mounted on a surface of a substrate, such as printed circuit board (PCB) 305, with each acoustic actuator 303a-b being configured to generate displacements along a direction parallel with respect to the surface of the PCB 305 in response to an electrical signal applied thereto. By mechanically coupling acoustic actuators 303a-b with respective speaker membranes 301a-b, the speaker membranes 301a-b may be configured to deflect responsive to displacements generated by respective acoustic actuators 303a-b.

In addition, speaker box 311 may define separate acoustic back volumes 315a-b adjacent respective speaker membranes 301a-b. In addition, speaker box 311 may include a first speaker box wall 317 with openings therethrough adjacent the respective actuators 303a-b, and each of speaker membranes 301a-b may be secured across a respective opening through speaker box wall 317. Second speaker box wall 323 may be spaced apart from first speaker box wall 317 so that acoustic back volumes 315a and 315b are defined between first and second speaker box walls 317 and 323. In addition, antenna 131 or portions thereof may be provided on second speaker box wall 323 so that acoustic back volume 315a and/or 315b separate antenna 131 (or portions thereof) from acoustic actuators 303a-b and/or other electrically conductive elements of the electronic device. Antenna 131 may be provided, for example, using a flexible conductive material that is bonded to speaker box wall 323. While antenna 131 is shown by way of example outside speaker box 311, antenna 131 or portions thereof may be provided on an inside surface of speaker box wall 323 according to other embodiments of the present invention. By using a same empty space to provide acoustic back volumes and to provide antenna volume and by providing acoustic actuators 303a-b (including electrically conductive and magnetic elements) outside the acoustic back volumes, performance of both loudspeakers 101 and antenna 131 may be improved.

Speaker box 311 and/or portions thereof may be formed as an inside portion of housing 201, or speaker box 311 and/or portions thereof may be formed separate from housing 201 and then assembled into housing 201. According to some embodiments of the present invention, for example, housing 201 may include a first piece defining front side 203, and portions of speaker box 311 including walls 317 and 323 may be formed (e.g., using injection molding) as an inside portion of the first piece of housing 201. Housing 201 may include a second piece defining back side 205, and a portion of an inside surface of the second piece may seal an open side of speaker box 311. According to other embodiments of the present invention, speaker box 311 including walls 317 and 323 and an open side may be formed separately from housing 201, and the open side of speaker box 311 may be sealed once assembled inside housing 201.

PCB 305 may have a plurality of integrated circuit semiconductor devices 321 mechanically mounted on and electrically coupled to PCB 305. More particularly, elements of controller 111, transceiver 115, and/or memory 117 (discussed above with respect to FIG. 1) may be implemented using one or more of integrated circuit semiconductor devices 321 and/or discrete electronic devices mounted on and electrically coupled to printed circuit board 305. Moreover, controller 111 and/or elements thereof may be electrically coupled to display 129, keyboard/keypad 119, joystick/trackball 133, ear speaker 121, microphone 123, loudspeaker 101, memory 117, and/or transceiver 115 through electrically conductive paths (e.g., conductive traces and/or vias) provided in/on PCB 305.

In addition, a respective acoustic enclosure 325a-b may be provided for each loudspeaker. More particularly, each acoustic enclosure 325a-b may define a respective acoustic front volume 327a-b so that each speaker membrane 301 a-b is between respective acoustic front and back volumes 327a-b and 315a-b. Each acoustic enclosure 325a-b may define an actuator opening therethrough, and each acoustic actuator 303a-b may extend through the actuator opening of the respective enclosure 325a-b. In addition, each acoustic enclosure 325a-b may define a port 329a-b configured to transmit sound generated by the respective acoustic actuator 313a-b and speaker membrane 301a-b. After assembling the electronic device so that speaker box 311, PCB 305, actuators 303a-b, and acoustic enclosures 325a-b are enclosed inside housing 201, ports 329a-b of acoustic enclosures 325a-b may be acoustically coupled with respective openings 241a-b through housing 201 (shown in FIG. 2B).

Figure 4:
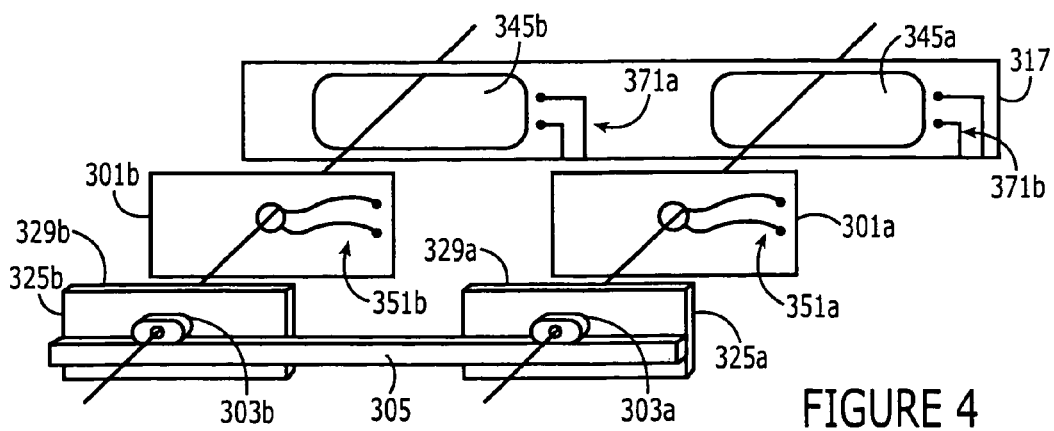
FIG. 4 is an exploded view illustrating elements of loudspeakers and methods of assembling such loudspeakers according to some embodiments of the present invention.

FIG. 4 is an exploded view illustrating elements of loudspeakers discussed above with respect to FIGS. 3A and 3B and methods of assembling such loudspeakers according to some embodiments of the present invention. As shown in FIG. 4, acoustic actuators 303 *a-b* may be mounted on a surface of PCB 305 (or other substrate) before assembly with speaker membranes 301*a-b* and speaker box wall 317. Acoustic actuators 303*a-b* may be mounted on PCB 305 using solder, epoxy, glue, or any other suitable adhesive. Because acoustic actuators 303*a-b* may be driven using conductive traces 351*a-b* provided on speaker membranes 301*a-b*, electrical coupling between acoustic actuators 303*a-b* and PCB 305 is not required.

After providing PCB 305 with acoustic actuators 303*a-b* mounted thereon, PCB 305 may be positioned adjacent to speaker membranes 3001*a-b*, and then acoustic actuators 303*a-b* may be bonded to respective speaker membranes 301*a-b* so that speaker membranes 301*a-b* are configured to deflect responsive to displacements generated by acoustic actuators 303*a-b*. According to some embodiments of the present invention, speaker membranes 301*a-b* may be bonded to speaker box wall 317 so that speaker membranes 301*a-b* extend across openings 345*a-b* of speaker box wall 317 before bonding to acoustic actuators 303*a-b*. For example, speaker box wall 317 and speaker membranes 301*a-b* may be assembled in a portion of housing 201 before positioning PCB 305 and acoustic actuators 303*a-b* adjacent thereto; PCB 305 and acoustic actuators 303*a-b* may be assembled in a portion of housing 201 before positioning adjacent speaker box wall 317 and speaker membranes 301*a-b*; and/or PCB 305 (with acoustic actuators 303*a-b*) and speaker box wall 317 (with speaker membranes 301*a-b*) may be assembled into housing 201 substantially simultaneously. Speaker membranes 301*a-b* may be directly bonded to speaker box wall 317, for example, using an adhesive, or a flexible suspension system (such as a foam suspension system) may be provided between speaker membranes 301*a-b* and speaker box wall 317.

As shown in FIG. 4, acoustic enclosures 325*a-b* may be assembled with acoustic actuators 303*a-b* and PCB 305 before bonding to speaker box wall 317. According to other embodiments of the present invention, acoustic enclosures 325*a-b* and speaker membranes 301*a-b* may be assembled with speaker box wall 317 before positioning PCB 305 (with acoustic actuators 303*a-b* thereon) adjacent to speaker box wall 317. According to still other embodiments of the present invention, acoustic enclosures 325*a-b* and speaker membranes 301*a-b* may be assembled with PCB 305 and acoustic actuators 303*a-b* before positioning PCB 305 adjacent to speaker box wall 317.

Once assembled with speaker box wall 317, each enclosure 325*a-b* may define a front volume 327*a-b* and a sound port 329*a-b* for a respective loudspeaker. As shown in FIGS. 3A, 3B, and 4, each front volume 327*a-b* may thus be defined by a respective enclosure 325*a-b*, a respective speaker membrane 301*a-b*, and portions of speaker wall 317, with a port 329*a-b* (or opening) defining an intended outlet for sound generated by the loudspeaker. Moreover, acoustic actuators 303*a-b* may extend through enclosures 325*a-b* to make contact with speaker membranes 301*a-b*. As discussed in greater detail below, a sufficiently tight fitting may be provided between acoustic actuators 303*a-b* and enclosures 325*a-b* to reduce sound leakage, and/or a flexible grommet may provide an acoustic seal between acoustic actuators 303*a-b* and enclosures 325*a-g*.

While speaker box wall 317 is shown in FIG. 4 separate from speaker box 311 for ease of illustration, speaker box wall 317 may be formed as an integral element of speaker box 311. According to other embodiments of the present invention, speaker box wall 317 may be formed separately from other portions of speaker box 311, and then assembled with a remainder of speaker box 311 before or after bonding speaker membranes 301*a-b* thereto.

As shown in FIG. 4, electrically conductive traces 351*a* may be provided on speaker membrane 301*a*, and electrically conductive traces 351*b* may be provided on speaker membrane 301*b*. The electrically conductive traces 351*a* and 351*b* may thus be configured to provide electrical coupling between controller 111 and acoustic actuators 303*a-b*. More particularly, conductive traces 351*a* and 351*b* may provide electrical coupling between coils of respective acoustic actuators 303*a-b* and conductive traces 371*a* and 371*b* on speaker box wall 317 that are in turn coupled to controller 111. Accordingly, an electrical coupling between a moving coil of an acoustic actuator and a fixed portion of the acoustic actuator and/or PCB 305 is not required. In addition, an anisotropic conductive film adhesive may be used to bond speaker membranes 301*a-b* to speaker box wall 317 and also provide electrical coupling between traces 351*a-b* and 371*a-b*.

As shown in FIGS. 3A, 3B, and 4, ports 329*a-b* may be provided to generate sound in a direction perpendicular with respect to PCB 305 to mate with openings through back side 205 of housing 201 according to some embodiments of the present invention. According to other embodiments of the present invention, ports 329*a-b* may be provided to generate sound in a direction parallel with respect to PCB 305 to mate with openings through edges 207*a-b* of housing 201.

By using speaker box 311 to provide both acoustic back volumes and an antenna volume (separating antenna 131 from other metallic components such as electrical components, shield cans, screws, etc.), improved antenna radio frequency (RF) performance and improved loudspeaker performance may be provided in a relatively small volume. Antenna RF performance may be improved by providing the loudspeaker assembly (including acoustic actuators) outside speaker box 311. Moreover, a size and shape of speaker box 311 may be more easily customized by a manufacture of the electronic device to provide a greater flexibility of an overall design of the electronic device in which the loudspeaker is being used. For example, a distance d (shown in FIG. 3A) separating speaker box walls 317 and 323 (and thus separating antenna 131 and acoustic actuators 303*a-b*) may be in the range of about 8 mm to 12 mm, and a height h of speaker box (shown in FIG. 3B) may be in the range of about 6 mm to 8 mm.

Figure 6:
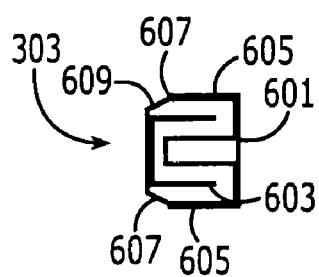
FIG. 6 is a cross sectional view of an acoustic actuator according to some embodiments of the present invention.

As shown in FIG. 6, an acoustic actuator 303 may include a permanent magnet 601 and a coil 603 surrounded by enclosure 605. Moreover, a flexible suspension 607 may suspend coil 603 relative to permanent magnet 601 and enclosure 605 so that coil 603 may move relative to permanent magnet 601 and enclosure 605. In addition, connector landing 609 may be configured to be bonded to a speaker membrane so that movement of the coil results is displacement of the speaker membrane. In addition, connector landing 609 may provide an electrical coupling between electrically conductive traces on the speaker membrane and coil 603. Accordingly, electrical signals may be generated by controller 111 and transmitted through traces on the speaker membrane to coil 603 so that changing magnetic fields generated by coil 603 result in movement of coil 603. For example, an anisotropic conducive film (ACF) may be used to bond connector landing 609 to a speaker membrane and also provide electrical coupling between traces on the speaker membrane and coil 603.

Figure 5A:
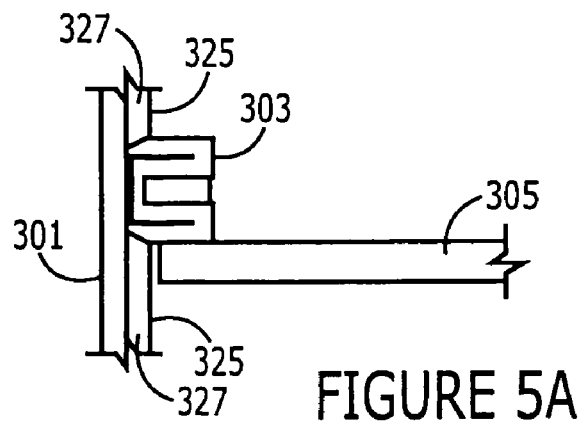
FIGS. 5A and 5B are enlarged cross sectional views illustrating portions of enclosures and acoustic actuators according to some embodiments of the present invention.
Figure 5B:
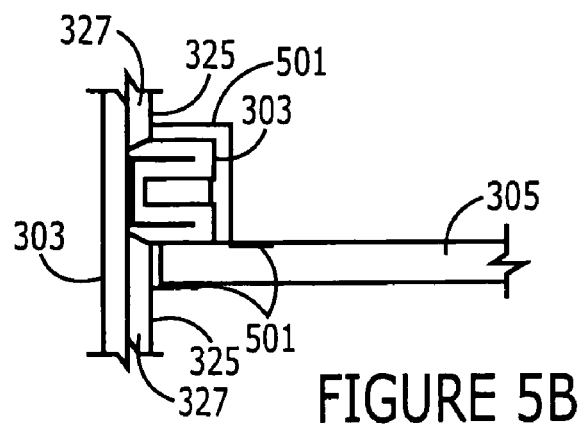

As shown in FIG. 5A, a fitting between acoustic actuator 303 and an opening through enclosure 325 so that leakage from acoustic front volume 327 is sufficiently reduced. As shown in FIG. 5B, a grommet 501 may be provided around acoustic actuator 303 to further reduce leakage from acoustic front volume 327. Grommet 501, for example, may comprise a flexible material (e.g., rubber, silicone, etc.) to provide a better seal between acoustic actuator 303 and enclosure 325. Only portions of enclosure 325, acoustic front volume 327, speaker membrane 301, and PCB 305 are shown in FIGS. 5A and 5B to more clearly illustrate a fitting of acoustic actuator 303 relative to the opening through enclosure 325.

As shown in FIGS. 3A, 3B, and 4, a speaker membrane may be provided as a planar sheet of a flexible material that is bonded to a speaker box wall to cover an opening in the speaker box wall according to some embodiments of the present invention. According to other embodiments of the present invention, however, other speaker membrane structures may be used. For example, a speaker membrane may be provided as a cone diaphragm, and/or a suspension system may be provided between the speaker membrane and the speaker box wall.

By separating loudspeaker assembly so that the acoustic actuator is bonded to a printed circuit board before bonding to the speaker membrane, a flexibility of manufacture and design may be increased. For example, a design of the speaker box, speaker box wall, speaker box wall openings, and speaker membrane may be varied while using a same actuator/PCB assembly/structure. Accordingly, a manufacturer of an electronic device incorporating such a loudspeaker may be able to more easily design/adapt/customize/tune a loudspeaker to conform with changing product needs without having to rely on an outside speaker vendor to provide a suitable loudspeaker. More particularly, a manufacturer of an electronic device may be more easily able to adapt a size and shape of speaker box 311, speaker box wall openings, and speaker membrane than may be possible if forced to rely on loudspeaker assemblies available from outside suppliers.

In the drawings and specification, there have been disclosed examples of embodiments of the invention and, although specific terms are employed, they are used in a generic and descriptive sense only and not for purposes of limitation, the scope of the invention being set forth in the following claims.

That which is claimed is:

1. An electronic device comprising:
    a substrate having a major surface;
    an acoustic actuator mounted on the major surface of the substrate wherein the acoustic actuator is configured to generate displacements along a direction parallel with respect to the major surface of the substrate in response to an electrical signal applied thereto;
    a speaker box defining an acoustic volume, wherein the speaker box includes a speaker box wall with a speaker box opening therethrough adjacent the acoustic actuator wherein the speaker box wall is a first speaker box wall;
    a speaker membrane across the speaker box opening adjacent the acoustic actuator, wherein the speaker membrane is mechanically coupled to the acoustic actuator so that the speaker membrane is configured to deflect responsive to displacements generated by the acoustic actuator, wherein the major surface of the substrate and the speaker membrane are non-parallel;
    a wireless transmitter and/or receiver configured to transmit and/or receive wireless communications from a remote electronic device;
    a controller electrically coupled to the wireless transmitter and/or receiver wherein the controller is configured to process the communications transmitted to and/or received from the remote electronic device; and
    an antenna electrically coupled to the wireless transmitter and/or receiver, wherein the antenna extends along a second speaker box wall spaced apart from the first speaker box wall so that the acoustic volume is defined between the first and second speaker box walls and so that the acoustic volume is between portions of the antenna and the acoustic actuator.

2. An electronic device according to claim 1 wherein the substrate comprises a printed circuit board, the electronic device further comprising:
    at least one semiconductor integrated circuit electronic device mechanically mounted on the printed circuit board and electrically coupled thereto.

3. An electronic device according to claim 1 wherein the wireless transmitter and/or receiver comprises a wireless transceiver configured to transmit and receive radiotelephone communications, the electronic device further comprising:
    a housing defining first and second ends and enclosing the substrate, the acoustic actuator, the speaker box, the speaker membrane, the wireless transceiver, and the antenna, wherein the speaker box and the antenna are adjacent the first end of the housing;
    a microphone adjacent the first end of the housing and electrically coupled to the controller wherein the microphone is configured to convert sound into an electrical signal to be processed by the controller and transmitted by the transceiver and wherein the microphone is acoustically coupled to a first opening through the housing; and
    a speaker adjacent the second end of the housing and electrically coupled to the controller wherein the speaker is configured to convert an electrical signal from the controller into sound and wherein the speaker is acoustically coupled to a second opening through the housing.

4. An electronic device according to claim 1 wherein the acoustic volume is a first acoustic volume, the electronic device further comprising:
    an acoustic enclosure defining a second acoustic volume so that the speaker membrane is between the first and second acoustic volumes, wherein the acoustic enclosure defines an actuator opening therethrough, wherein the acoustic actuator extends through the actuator opening, and wherein the acoustic enclosure defines a port configured to transmit sound generated by the acoustic actuator and speaker membrane; and
    a housing enclosing the substrate, the acoustic actuator, the speaker box, and the speaker membrane, wherein the port is acoustically coupled to an opening through the housing.

5. An electronic device according to claim 1 wherein the acoustic actuator comprises a coil and a permanent magnet.

6. An electronic device according to claim 5 wherein the permanent magnet is fixed relative to the substrate and wherein the coil is configured to move in the direction parallel with respect to the surface of the substrate responsive to the electrical signal.

7. An electronic device according to claim 6 further comprising:
    a pair of electrical traces on the speaker membrane and electrically coupled to the coil, wherein the coil is configured to move responsive to the electrical signal, wherein the electrical signal is applied to the coil through the pair of electrically conductive traces, and wherein portions of the pair of electrical traces are configured to move with the speaker membrane relative to the substrate responsive to displacements generated by the acoustic actuator.

8. A method of assembling an electronic device, the method comprising:
providing a substrate having a major surface and having an acoustic actuator mounted on the major surface of the substrate wherein the acoustic actuator is configured to generate displacements along a direction parallel with respect to the major surface of the substrate in response to an electrical signal applied thereto;
after providing the substrate having the acoustic actuator mounted thereon, positioning the substrate adjacent to a speaker membrane;
after positioning the substrate adjacent to the speaker membrane, bonding the acoustic actuator to the speaker membrane so that the speaker membrane is mechanically coupled to the acoustic actuator and so that the speaker membrane is configured to deflect responsive to displacements generated by the acoustic actuator, wherein the major surface of the substrate and the speaker membrane are non-parallel;
providing a speaker box defining an acoustic volume wherein the speaker box includes a speaker box wall having an opening therethrough;
before positioning the substrate adjacent to the speaker membrane, providing the speaker membrane across the opening through the speaker box wall, wherein the speaker box wall is a first speaker box wall;
providing an antenna that extends along a second speaker box wall of the speaker box spaced apart from the first speaker box wall so that the acoustic volume is defined between the first and second speaker box walls and so that the acoustic volume is between portions of the antenna and the acoustic actuator.

9. A method according to claim 8 further comprising:
before positioning the substrate adjacent to the speaker membrane, providing the speaker membrane across an opening through a speaker box wall.

10. A method according to claim 8 wherein the substrate comprises a printed circuit board, the method further comprising:
electrically and mechanically coupling at least one semiconductor integrated circuit electronic device to the printed circuit board.

11. A method according to claim 8 further comprising:
providing a wireless transceiver configured to transmit and receive radiotelephone communications, wherein the transceiver is electrically coupled to the printed circuit board and to the antenna;
providing a microphone electrically coupled to the transceiver wherein the microphone is configured to convert sound into an electrical signal to be transmitted by the transceiver;
providing an ear speaker electrically coupled to the transceiver wherein the ear speaker is configured to convert an electrical signal from the transceiver into sound; and
enclosing the substrate, the acoustic actuator, the speaker box, the speaker membrane, the antenna, the wireless transceiver, the microphone, and the ear speaker in a housing, wherein the microphone is acoustically coupled to a first opening through the housing adjacent a first end of the housing, wherein the ear speaker is acoustically coupled to a second opening through the housing adjacent a second end of the housing, and wherein the antenna is adjacent the first end of the housing.

12. A method according to claim 8 wherein the acoustic volume is a first acoustic volume, the method further comprising:
providing an acoustic enclosure defining a second acoustic volume so that the speaker membrane is between the first and second acoustic volumes, wherein the acoustic enclosure defines an actuator opening therethrough, wherein the acoustic actuator extends through the actuator opening, and wherein the acoustic enclosure defines a port configured to transmit sound generated by the acoustic actuator and speaker membrane; and
enclosing the substrate, the acoustic actuator, the speaker box, and the speaker membrane in a housing wherein the port is acoustically coupled to an opening through the housing.

13. A method according to claim 8 wherein the acoustic actuator comprises a coil and a permanent magnet.

14. A method according to claim 13 wherein the permanent magnet is fixed relative to the substrate and wherein the coil is configured to move in the direction parallel with respect to the surface of the substrate responsive to the electrical signal.

15. A mobile radiotelephone comprising:
a printed circuit board having a major surface;
an acoustic actuator mounted on the major surface of the printed circuit board wherein the acoustic actuator is configured to generate displacements along a direction parallel with respect to the major surface of the substrate in response to an electrical signal applied thereto;
a speaker box including first and second spaced apart speaker box walls defining an acoustic volume therebetween, and wherein the first speaker box wall has a speaker box opening therethrough adjacent the acoustic actuator;
a speaker membrane across the speaker box opening adjacent the acoustic actuator, wherein the speaker membrane is mechanically coupled to the acoustic actuator so that the speaker membrane is configured to deflect responsive to displacements generated by the acoustic actuator, wherein the major surface of the substrate and the speaker membrane are non-parallel;
a wireless transceiver electrically coupled to the printed circuit board wherein the wireless transceiver is configured to transmit and receive wireless communications to and from a remote electronic device;
a controller electrically coupled to the wireless transceiver wherein the controller is configured to process the communications transmitted to and/or received from the remote electronic device; and
an antenna electrically coupled to the wireless transceiver, wherein the antenna extends along the second speaker box wall so that the acoustic volume is between portions of the antenna and the acoustic actuator.

16. A mobile radiotelephone according to claim 15 further comprising:
a housing defining first and second ends and enclosing the substrate, the acoustic actuator, the speaker box, the speaker membrane, the wireless transceiver, and the antenna, wherein the speaker box and the antenna are adjacent the first end of the housing;
a microphone adjacent the first end of the housing and electrically coupled to the controller wherein the microphone is configured to convert sound into an electrical signal to be processed by the controller and transmitted by the transceiver and wherein the microphone is acoustically coupled to a first opening through the housing; and an ear speaker adjacent the second of the housing and electrically coupled to the controller wherein the speaker is configured to convert an electrical signal from the controller into sound and wherein the speaker is acoustically coupled to a second opening through the housing.

17. A mobile radiotelephone according to claim 16 wherein the acoustic volume is a first acoustic volume, the electronic device further comprising:

an acoustic enclosure defining a second acoustic volume so that the speaker membrane is between the first and second acoustic volumes, wherein the acoustic enclosure defines an actuator opening therethrough, wherein the acoustic actuator extends through the actuator opening, and wherein the acoustic enclosure defines a port configured to transmit sound generated by the acoustic actuator and speaker membrane wherein the port is acoustically coupled to a third opening through the housing.

* * * * *